July 4, 1950 B. F. TYSON 2,513,761

WAVE-SIGNAL SELECTOR SYSTEM

Filed June 14, 1945 2 Sheets-Sheet 1

INVENTOR.
BENJAMIN F. TYSON
BY Harry C. Page
ATTORNEY

INVENTOR.
BENJAMIN F. TYSON
BY Harry C. Page
ATTORNEY

Patented July 4, 1950 2,513,761

UNITED STATES PATENT OFFICE 2,513,761

WAVE-SIGNAL SELECTOR SYSTEM

Benjamin F. Tyson, Bayside, N. Y., assignor, by mesne assignments, to Hazeltine Research, Inc., Chicago, Ill., a corporation of Illinois Application June 14, 1945, Serial No. 599,372

16 Claims. (Cl. 178—44)

Figure 1:
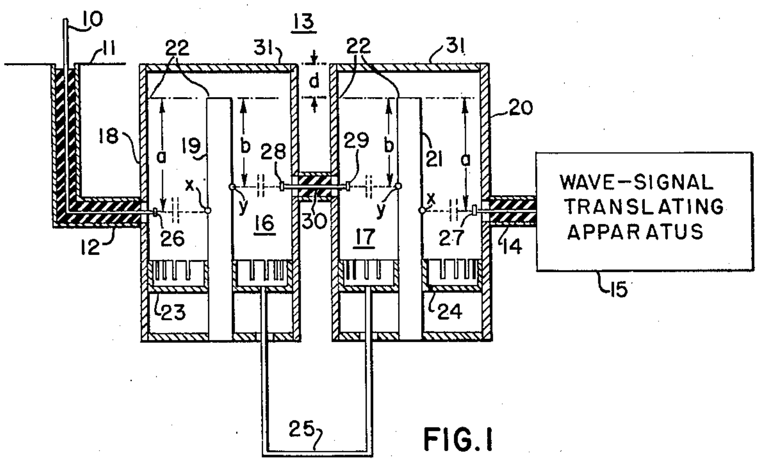

The present invention relates to wave-signal selector systems and, particularly, to such systems of the resonant wave-guide type tunable over a given relatively wide frequency range of high-frequency wave signals. In greater particularity, the invention relates to such tunable selector systems having approximately constant band width when tuned to resonate at any selected wave-signal frequency in a relatively wide range of frequencies.

Wave-signal selector systems are conventionally widely used in wave-signal apparatus to effect the translation of desired wave signals to the exclusion of undesired wave signals. For example, in wave-signal receivers of the superheterodyne type, one or more tunable selector systems are employed in the high-frequency wave-signal amplifier stages by which to select a desired received wave signal to the exclusion of undesired wave signals and one or more fixed-tuned selector systems are utilized in the intermediate-frequency amplifier stages by which further to select the desired wave signal to the exclusion of the undesired wave signals.

Such wave-signal selector systems usually translate with appreciable amplitude all wave signals having frequencies lying within a predetermined continuous frequency band, limited by an upper and a lower cutoff frequency, and substantially reduce the amplitudes of wave signals having frequencies outside of that band. The group of wave-signal frequencies translated by the selector is called the pass band of the latter and may be either narrow or wide as desired for a specific application. Where the selector system is of the fixed-tuned type, as in the intermediate-frequency stages of a wave-signal receiver, a desired band-pass characteristic for the system may be readily provided by suitable design and adjustment of the system components. Tunable selector systems, on the other hand, may readily be provided with a desired band-pass characteristic when tuned to one wave-signal frequency but require more complicated circuit arrangements or a particular manner of variation of related circuit components thereof, or both, where it is desired that the band width of the system remain approximately constant with tuning of the system over a range of such frequencies.

The problems encountered in the design and adjustment of a constant-band-width tunable selector system have heretofore been generally capable of solution in relatively low-frequency wave-signal selector systems. This is because such systems employ lumped inductors and capacitors which may be designed and constructed to have some particular law of variation with tuning made necessary to maintain an approximately constant band width for the selector system. High-frequency wave-signal selector systems employing resonant wave guides, however, have no such lumped circuit components but rather rely for their resonance phenomena upon distributed inductances and capacitances of the wave guide. The term "wave guide" applies to a system of conductive surfaces which act as the boundary of an electric wave and have the ability of directing the propagation of such waves, much as the rigid wall of a speaking tube is used to guide sound by preventing the sound from spreading into space. Wave guides may take the form of one or more conductors in open space, one conductor enclosed within but electrically insulated from a second conductor as in a conventional coaxial transmission line, or may simply comprise a single hollow conductor capable of propagating the electric wave through the interior thereof.

For many applications, it would be desirable to provide a resonant wave-guide type of wave-signal selector system adjustably tunable over a given relatively wide frequency range and having a band-pass characteristic of any width desired, yet one the band width of which remains approximately constant over the tuning range of the system. It would further be desirable that such selector systems involve no complicated circuit arrangement or peculiar mode of adjustment with tuning, but rather, it is desirable that they be simple both electrically and mechanically.

It is an object of the present invention, therefore, to provide a wave-signal selector system of the wave-guide type, and one adjustable over a given relatively wide frequency range, which possesses the desirable characteristics last-mentioned.

It is a further object of the invention to provide a constant-band-width wave-signal selector system of the wave-guide type which is adapted to be coupled either capacitively or inductively as desired to associated wave-signal apparatus.

It is an additional object of the invention to provide a constant-band-width wave-signal selector system, adjustable over a given relatively wide frequency range, which may readily utilize in tandem as many resonant wave guides as desired or necessary to effect a predetermined band-pass characteristic for the system.

It is a further object of the invention to provide a constant-band-width wave-signal selector system of the wave-guide type, and one adjustable over a given relatively wide frequency range, which may be suitably adjusted for purposes of tuning by any of a large number of mechanical arrangements as best befits a particular application.

In accordance with a particular form of the invention, a wave-signal selector system, adjustable over a given relatively wide frequency range, comprises a resonant wave guide having a frequency pass band of predetermined band width, adapted to be coupled to an electrical device and means for adjusting the effective electrical length of the wave guide to tune the selector system over the aforesaid frequency range. The selector includes wave-signal coupling means electrically coupled to the wave guide at a predetermined point along the length thereof and adapted to provide coupling between the wave guide and a resistance component of impedance provided by the device which is effective to increase the aforesaid band width of the wave guide. The location of the coupling point is so selected that the wave guide has, for any given value of the resistance component of impedance and when tuned over the aforementioned frequency range, approximately maximum band width at substantially the mean frequency of the frequency range. The location of the coupling point is determined by the relation $$\frac{\omega m}{c}\tan\frac{\omega m}{c}=p$$

where $\omega$ represents the angular frequency in radians per second of the signal in the wave guide at resonance, $c$ represents the velocity of light in centimeters per second, $m$ represents the distance in centimeters between the coupling point and one end of the wave guide, and $p$ has a value determined by the characteristics of the wave guide and the device, whereby the selector system has for a constant value of the resistance component of impedance a substantially constant band width for any adjustment within the range.

For a better understanding of the present invention, together with other and further objects thereof, reference is had to the following description taken in connection with the accompanying drawings, and its scope will be pointed out in the appended claims.

Figure 1A:
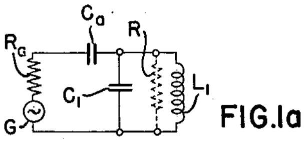
Figure 1B:
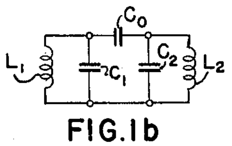
Figure 2:
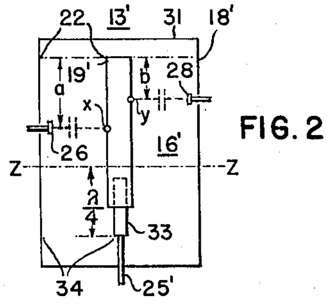
Figure 3:
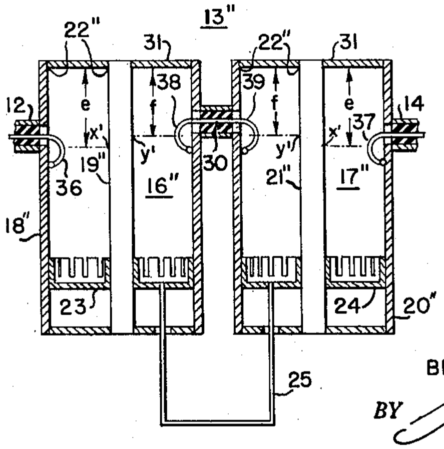
Figure 4:
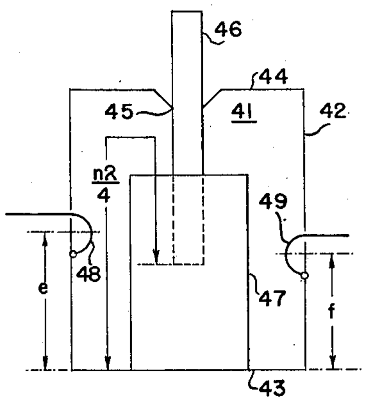
Figure 5:
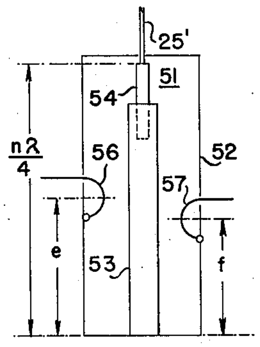
Figure 6:
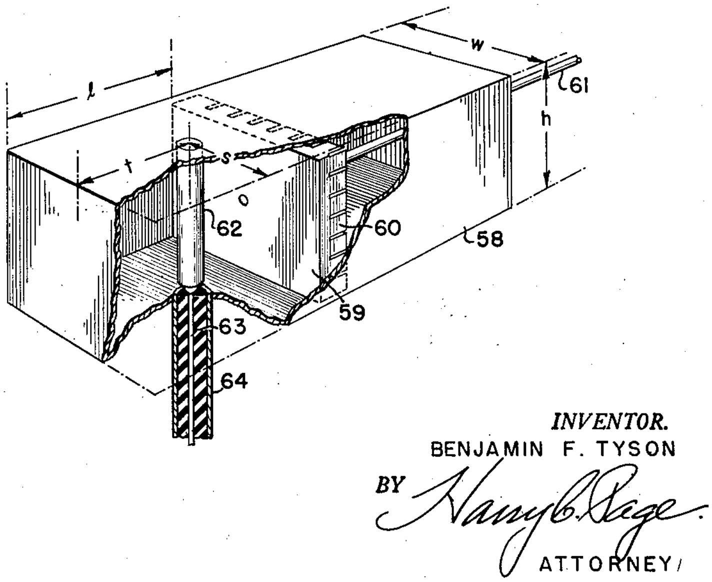

Referring now to the drawings; Fig. 1 illustrates, partly schematically, a complete wave-signal translating system which utilizes a selector system embodying the present invention in a particular form; Figs. 1a and 1b, respectively, represent equivalent circuit diagrams of a selected portion and of the entire selector system of Fig. 1; Fig. 2 schematically represents a selector system of the Fig. 1 type embodying a modified form of the invention; Fig. 3 illustrates a selector system embodying an additional modified form of the invention; Figs. 4 and 5 schematically represent selector systems embodying yet other forms of the invention; and Fig. 6 illustrates an embodiment of the invention as applied to a rectangular wave guide.

Referring now more particularly to Fig. 1 of the drawings, there is represented, partly schematically, a complete wave-signal translating system which utilizes a wave-signal selector system embodying the present invention in a particular form. The wave-signal translating system includes an antenna 10 and conductive disc 11, providing a ground plane for the antenna, which are coupled by an electrical device, in particular a coaxial transmission line 12 to a wave-signal selector system 13, presently to be described in greater detail. The selector system 13 is coupled by a coaxial transmission line 14 to a wave-signal circuit of a wave-signal translating apparatus 15 which may, for example, be a wave-signal receiver or a wave-signal transmitter.

It will be understood that the various units just described may, with the exception of the selector system 13, be of a conventional construction and operation, the details of which are well known in the art rendering a further detailed description thereof unnecessary. Considering briefly the operation of the wave-signal translating system as a whole, and neglecting for the moment the detailed operation of the selector system 13 presently to be described, assume for purposes of the present description that the apparatus 15 is a wave-signal receiver. Wave signals received by the antenna system 10, 11 are translated by the transmission line 12 to the wave-signal selector system 13 which is tunable to select a desired received wave signal to the exclusion of undesired received wave signals. The selected received wave signal is translated by the selector system 13 and the transmission line 14 to the wave-signal translating apparatus 15 where the wave signal is suitably amplified and the modulation components thereof derived and utilized.

Referring now more particularly to the portion of the wave-signal translating system embodying the present invention, the wave-signal selector system 13, which is adjustable over a given relatively wide frequency range, includes a plurality of resonant wave guides 16, 17, each of the coaxial transmission-line type having coaxially supported outer and inner conductors 18, 19 and 20, 21, respectively. By a "coaxial" line type of wave guide is meant, in its broad concept, one having an inner conductor substantially surrounded by an outer conductor which acts as an electromagnetic-wave shield for the former, the two conductors cooperating to translate electromagnetic energy therebetween and longitudinally thereralong. Each of these transmission lines has an effective electrical length equal approximately to an odd number of quarter-wave lengths at the lowest frequency in the aforementioned frequency range and is electrically open at one end 22 thereof to provide at the open end a fixed region of maximum wave-signal impedance. Each of the transmission lines 16 and 17 includes means for adjusting the effective electrical length thereof to tune the selector system 13 over the aforementioned frequency range. In particular, this means comprises means co-operating with another region of the transmission line spaced from the region 22 of maximum wave-signal impedance for providing a second adjustable region of minimum wave-signal impedance. This means comprises for the line 16 a conductive piston member 23 having resilient contact fingers conductively engaging the outer conductor 18 and inner conductor 19, thus to short-circuit the transmission line 16 and terminate the electromagnetic field thereof at the region of the member 23. A similar conductive piston member 24 is provided for the line 17. The members 23 and 24 are movable longitudinally of their respective lines to adjust the effective electrical lengths thereof to an odd number of quarter-wave lengths at any frequency within the aforementioned frequency range. The members 23 and 24 are mechanically coupled by a tuning member 25, which may be either of metal or insulating material, to effect simultaneous tuning of the lines 16 and 17 to a desired wave-signal frequency.

The wave-signal selector system 13 also includes a plurality of wave-signal coupling means electrically coupled to individual ones of the transmission lines 16 and 17 at a first predetermined point along the length of each thereof and adapted to provide coupling between the wave guides and individual resistance components of impedance which are effective to increase the band width of each transmission line. This means for line 16 comprises a conductive element 26 secured to the inner conductor of the transmission line 12 and lying within the transmission line 16 to be capacitively coupled, as indicated by the broken lines, to the inner conductor 19 thereof. A similar conductive element 27 is provided for line 17 and is capacitively coupled to the inner conductor 21 thereof and connected to the inner conductor of the transmission line 14. The location of each of these first coupling points is selected a fixed distance $a$ from the open ends 22 of the lines 16 and 17, and thus, a fixed distance from the regions of maximum impedance thereof. The value of the distance $a$ is so selected that each of the wave guides has for any given value of its individual resistance component of impedance and when tuned over the frequency range, approximately maximum band width at substantially the mean frequency of the aforementioned frequency range. Under the conditions stated, each line has for a constant value of the resistance component of impedance coupled thereto a substantially constant band width when tuned to resonate at any frequency within the range.

The wave-signal selector system 13 also includes wave-signal coupling means electrically, and particularly capacitively, coupling the transmission lines 16 and 17 at a second predetermined point along the length of each thereof. This means comprises a conductive element 28 lying within the transmission line 16 and capacitively coupled, as indicated by the broken lines, to the center conductor 19 thereof and a conductive element 29 lying within the line 17 and capacitively coupled to the center conductor 21 thereof, the elements 28 and 29 being connected together by conductive member 30 which should have the shortest practicable length. The locations of the last-mentioned coupling points are also selected a fixed distance $b$ from the open ends 22 of the lines, and thus, also a fixed distance from the regions of maximum impedance thereof. The distance $b$ is so selected that the selector system has, when tuned over its frequency range, approximately maximum over-all band width at substantially the mean frequency of the aforementioned frequency range. Under the conditions last stated, the selector system 13 also has a substantially constant over-all band width when tuned to resonate at any frequency within the range.

Adequate shielding of the transmission lines 16 and 17 is effected by extending the outer conductors thereof a small distance $d$ and by closing the extended end of the outer conductors by a conductive plate 31.

In considering the operation of the selector system just described, reference is made to Fig. 1$a$ which represents the equivalent circuit diagram of the transmission line 16. The antenna system of the Fig. 1 arrangement is represented in conventional manner in Fig. 1$a$ in that it is indicated as matched to the transmission line 12 so that there is coupled to the line 16 only a resistor $R_a$, having a value of resistance equal to the characteristic impedance of the transmission line 12. The capacitive coupling between the conductive element 26 and the inner conductor 19 of the line 16 is represented in Fig. 1$a$ by the condenser $C_a$. For convenience of reference, it will be assumed that the conductive element 26 forms one plate of a condenser $C_a$ the other plate of which is connected to a tap point $x$ on the inner conductor 19 as indicated by broken lines in Fig. 1.

In the following mathematical analysis of the selector system operation, it is assumed that the capacitive reactance of the condenser $C_a$ is appreciably greater than the value of the resistor $R_a$ or, in other words, that it is appreciably greater than the characteristic impedance of the transmission line 12. The effective shunt capacitance at resonance of the line 16 is represented in Fig. 1$a$ by a lumped capacitance $C_1$ having a value equal to one-half the total capacitance of the line at resonance. It can be shown that the value of the capacitance $C_1$ is given by the relation:

$$C_1=\frac{\pi/4}{\omega K} \tag{1}$$

where $\omega$=angular frequency in radians per second ($2\pi f$) of the line 16 at resonance.

K=the characteristic impedance of the line 16.

The effective shunt inductance at resonance of the line 16 is represented in the equivalent circuit of Fig. 1$a$ by a lumped inductance $L_1$ having a value required to tune the equivalent shunt-resonant circuit $C_1$, $L_1$ to resonance. The band width of this resonant circuit, and the line 16, is determined by the equivalent shunt-damping resistance which appears across the circuit, this resistance being represented in Fig. 1$a$ by the broken-line resistor R. For the equivalent circuit diagram of Fig. 1$a$, it can be shown that the value of the effective shunt-damping resistor R for the conditions heretofor assumed is given by the relation:

$$R=\frac{1}{\omega^2 C_a^2 R_a}\cdot\frac{1}{\cos^2\frac{\omega a}{c}} \tag{2}$$

where $a$=the distance in centimeters between the tap point $x$ and the open end 22 of the line 16.

$c$=the velocity of light in centimeters per second.

The sharpness of resonance or band width of a resonant circuit is determined by the ratio of energy stored in the circuit to the energy dissipated therein and, for a shunt-damped parallel-resonant circuit, therefore, is proportional to the resistance shunting the circuit and inversely proportional to the reactance thereof. This ratio of stored energy to dissipated energy is called the Q of the circuit. For the equivalent circuit of Fig. 1$a$ the Q is given by the relation:

$$Q=\omega C_1 R \tag{3}$$

The band width of a resonant circuit is conventionally expressed with relation to the band width at those angular frequencies on either side of resonance where the response of the circuit is three decibels below the response at resonance. For this band width, the Q of the circuit is given by the relation:

$$Q=\frac{\omega}{\Delta\omega} \quad (4)$$

where $\Delta\omega$=the band width at three decibles below the resonant response of the resonant circuit.

From Equations 3 and 4, it will be apparent that the band width has the value:

$$\Delta\omega=\frac{1}{C_1R} \quad (5)$$

Substituting in Equation 5 the value of R given by Equation 2:

$$\Delta\omega=\frac{C_a^2}{C_1}R_a\omega^2\cos^2\frac{\omega a}{c} \quad (6)$$

Substituting the value of $C_1$ from Equation 1 in Equation 6:

$$\Delta\omega=\frac{4}{\pi}C_a^2R_aK\omega^3\cos^2\frac{\omega a}{c} \quad (7)$$

Differentiating Equation 7 with relation to the angular frequency and setting the differential equal to zero shows that the band width has a maximum value given by the relation:

$$\frac{\omega a}{c}\tan\frac{\omega a}{c}=\frac{3}{2} \quad (8)$$

Equation 8 is satisfied when:

$$\frac{\omega a}{c}=0.99\text{ radians} \quad (9)$$

Maximum band with is thus provided when the distance $a$ between the tap point $x$ and the open end 22 of the line 16 has the value:

$$a=0.99\frac{c}{\omega}=\frac{0.99\lambda}{2\pi}=0.158\lambda \quad (10)$$

where $\lambda$=the wave length of a wave signal having the resonant frequency to which the line 16 is tuned.

The value of wave length used in Equation 10 to determine the distance $a$ preferably is that value of wave length corresponding to the mean or midband frequency of the range of frequencies over which the line 16 is tunable. For this value of the distance $a$, applicant has found that the band width of the line 16 remains substantially constant over the tuning range of the line and that, on the other hand, the band width does not remain substantially constant for any other substantially different value of the distance $a$. It may be noted that while the value of the distance $a$ for maximum band width is related to the selected wave length used in Equation 10, the actual value of the maximum band width at this wave length is given by Equation 7 and consequently varies with the size of the coupling capacitance $C_a$, the characteristic impedance $R_a$ of the line 12 and the characteristic impedance K of the line 16. Thus, to establish any desired value of maximum band width, it is usually most convenient to choose the size of the conductive element 26 or its spacing from the inner conductor 19 of the line, or both.

It will be apparent from the foregoing discussion of Fig. 1$a$ that the distance $a$ of the transmission line 17, and the value of maximum band width, are similarly selected with relation to the wave-signal wave length and the resistance component of impedance which is coupled by the coupling element 27 to the line 17 from that circuit of unit 15 to which the line 17 is coupled.

Fig. 1$b$ represents the equivalent circuit diagram of the coupled transmission lines 16 and 17. $L_1$ and $C_1$ represent the circuit components of the parallel-resonant circuit equivalent to the transmission line 16 as in Fig. 1$a$, while $L_2$ and $C_2$ represent the components of the parallel-resonant circuit equivalent to the transmission line 17. The conductive elements 28 and 29, which are connected together by the conductor 30 and are coupled to the respective inner conductors 19 and 21 of the respective transmission lines 16 and 17, provide an equivalent coupling capacitance $C_0$ which capacitively couples the transmission lines. In the following mathematical analysis of the operation of these coupled lines, it is assumed that the lines are identical and are simultaneously tuned to the same wave-signal frequency. Thus, of the equivalent circuit components, $C_1$ is equal to $C_2$ and $L_1$ is equal to $L_2$. It is further assumed that the coupling capacitance $C_0$ is very much less than the equivalent lumped capacitance $C_1$ or $C_2$ of either line.

It can be readily shown that the coefficient of coupling $k$ between the transmission lines 16 and 17 is given by the relation:

$$k=\frac{C_0}{C}\cos^2\frac{\omega b}{c} \quad (11)$$

where $C=C_1=C_2$ and has a value given by Equation 1.

$b$=the distance in centimeters between the tap point $y$ and the open end 22 of either of the lines 16 or 17.

For coupled circuits of this nature, the band width of the selector system including such circuits is conveniently expressed with relation to the band width separation between the outermost peaks of the band-pass translation characteristic of the system. Calling this band width $\Delta\omega'$, the coefficient of coupling $k$ between the coupled circuits is given by the relation:

$$k=\frac{\Delta\omega'}{\omega} \quad (12)$$

It will at once be apparent from Equations 11 and 12 that the band width of the coupled lines 16 and 17 has the value:

$$\Delta\omega'=\frac{4}{\pi}KC_0\omega^2\cos^2\frac{\omega b}{c} \quad (13)$$

When Equation 13 is differentiated with respect to the angular frequency and the differential is equated to zero, it is found that the band width has a maximum value given by the relation:

$$\frac{\omega b}{c}\tan\frac{\omega b}{c}=1 \quad (14)$$

Equation 14 is satisfied when:

$$\frac{\omega b}{c}=0.86\text{ radians} \quad (15)$$

or $$b=0.86\frac{c}{\omega}=0.86\frac{\lambda}{2\pi}=0.137\lambda \quad (16)$$

The values of wave length used in Equation 16 in deriving the distance $b$ is preferably, as in deriving the distance $a$ by use of Equation 10, a wave length corresponding to the mean or midband frequency of the frequency range over which the transmission lines 16 and 17 are tunable. Applicant has found that this value of the distance $b$ ensures substantially constant band width over the tuning range of the lines 16 and 17 while any other substantially different value does not do so. The maximum band width of the coupled lines is given by Equation 13 and is preferably established by choice of the size of the conductive elements 28 and 29 or their spacings from their respective associated inner conductors 19 and 21, or both. In view of the similarity of Equations 8 and 14 a generalized expression of these equations may take the form:

$$\frac{\omega m}{c}\tan\frac{\omega m}{c}=p \quad (17)$$

where $m$=the generalization of the terms $a$ and $b$, and
$p$=a constant being determined by the characteristics of the coupled units, being equal to $^3/_2$ or 1 when used as in Equation 8 or 14 respectively.

Fig. 2 represents schematically a modified form of wave-signal selector system essentially similar to either half of the selector system of Fig. 1. For convenience of description, elements of Fig. 2 are designated by reference numerals corresponding to those of similar elements of the line 16 to Fig. 1 and analogous elements are designated by similar reference numerals primed. The present selector system differs from that of Fig. 1 in that the present system has its effective electrical length varied, to tune the system, by the provision of a hollow inner conductor 19′ for the transmission line 16′ with a conductive member 33 arranged to telescope in conductive relation into the conductor 19′. The adjusting member 25′ of the present arrangement is of dielectric material. It will be understood that the transmission line 16′ is shown only schematically and that the conductor 19′ is suitably supported within the conductor 18′ in insulated relation therewith. As thus arranged, the transmission line 16′ is open circuited at its variable end 34 as well as its fixed end 22. As is well known, such a transmission line exhibits the characteristics of an impedance transformer in that it transforms the high impedance at its open end 34 to a low impedance at a region Z spaced one-quarter wave length distant from its open end 34. It will be apparent that the region Z moves longitudinally of the line 16′ with longitudinal adjustment of the conductive member 33 so that the low impedance at this region has the same effect and is the full equivalent of the conductive shorting member 23 of the Fig. 1 arrangement. The operation of this modified form of the invention is otherwise essentially similar to that of Fig. 1 and will not be repeated.

An additional modified form of the invention which utilizes inductive coupling, in contradistinction to the capacitive coupling employed in the Figs. 1 and 2 arrangements, is illustrated in Fig. 3. Aside from the manner of coupling, the instant wave-signal selector system is essentially similar to that of Fig. 1, similar elements being designated by similar reference numerals and analogous elements by similar reference numerals double primed. In the instant arrangement, the inner conductors 19″ and 21″ of the respective lines 16″ and 17″ are extended into conductive engagement with the conductive discs 31, 31 which close the lines. Additionally, the lines 16″ and 17″ are adjustable by movable members 23 and 24 to have an effective electrical length of an integral number of half-wave lengths at the lowest frequency of the operating frequency range of the selector system 13″. As earlier mentioned, inductive coupling is employed in the present selector system. To this end, the transmission line 12 is terminated by an inductive coupling loop 36 positioned within the line 16″ and spaced a distance $e$ from the fixed short-circuited end 22″ of the line; the transmission line 14 is similarly terminated in an inductive coupling loop 37 positioned within the line 17″ and spaced a distance $e$ from the fixed short-circuited end 22″ thereof; and the conductor 30 is terminated at one end by an inductive coupling loop 38 located within the line 16″ and spaced a distance $f$ from the fixed short-circuited end 22″ of the latter and is terminated at its other end by a similar inductive coupling loop 39 lying within the line 17″ and likewise spaced a distance $f$ from the fixed short-circuited end 22″ of the latter.

From the principle of duality, it will be apparent that the arrangement of the Fig. 3 selector system is essentially the inverse electrically of that of Fig. 1 and hence, that their operations are similar. The principle of duality is applicable to inverse electrical networks as more fully explained in "Communications Networks," volume II, page 246 et sequa, by E. A. Guillemin, published by John Wiley and Sons of New York (copyright 1935). Briefly considered, the principle of duality proceeds from the recognition that the behavior of an electrical network may be expressed either as the current response to an impressed voltage or as a voltage response to an impressed current. In using this principle, two electrical networks are the inverse of one another when the currents and magnetic fields in one circuit can be replaced by equivalent voltages and electrical fields at corresponding points in the second circuit, when the inductances and capacitances of one circuit are interchanged with equivalent capacitances and inductances, respectively, in corresponding positions in the second circuit, when the resistances in one circuit are replaced by equivalent conductances in the second circuit, when series and parallel branches of one circuit are replaced by parallel and series branches, respectively in the second circuit, and when short circuits and open circuits of the one circuit are replaced by open circuits and short circuits, respectively, in the other circuit.

Applying this principle to Figs. 1 and 3, it will be noted that the capacitive couplings of Fig. 1 which intercouple the electric fields in several portions of the Fig. 1 selector system are replaced by inductive couplings which intercouple the magnetic fields of corresponding portions of the Fig. 3 selector system. Similarly, the lines 16 and 17, open-circuited and having high impedances at their ends 22 in Fig. 1, are replaced by corresponding lines short-circuited and having low impedances at theirs ends 22″ in Fig. 3. Likewise, while the maximum voltages occur at the open ends 22 of the lines 16 and 17 of Fig. 1, the maximum currents occur at the shorted ends 22″ of the lines 16″ and 17″ in Fig. 3. Further, whereas the lines 16 and 17 are short-circuited by the respective piston members 23 and 24 and thus have low impedance one-quarter wave length distant from their open-circuited ends 22, the lines 16″ and 17″ are open-circuited and have maximum impedances at a point one-quarter wave length from their short-circuited ends 22″. Thus, since the Figs. 1 and 3 arrangements are the full inverse of one another, the distances $e$ between the coupling loops 36 and 37 of the respective lines 16″ and 17″ and the short-circuited ends 22″ of the latter are the same as the distances $a$ of the corresponding points of coupling in the Fig. 1 arrangement. Likewise, the distances $f$ between the coupling loops 38 and 39 and the short-circuited ends 22'' of the transmission lines in the Fig. 3 arrangement have the same values as the spacings b between the corresponding points of coupling and the open ends 22 of the lines in the Fig. 1 system. The spacings e and f may thus be evaluated by a mathematical analysis similar to that explained above in connection with the Fig. 1 arrangement or the values may be derived for a selector system of the Fig. 1 type and may then be used for a system of the Fig. 3 type. The operation of the Fig. 3 selector system is otherwise essentially similar to that described in connection with Fig. 1 and will not be repeated.

Fig. 4 schematically represents a modified form of wave-signal selector system essentially similar to the Fig. 3 system except that the instant arrangement utilizes a re-entrant type of coaxial transmission lone 41. The line 41, which may be inductively coupled in tandem if desired with one or more similar such lines as in the Fig. 3 arrangement, includes an outer conductor 42 having its ends closed by a conductive member 43 and a conductive member 44 coaxially apertured at 45. The edges of the aperture 45 are formed as resilient fingers which conductively engage an axially movable inner coaxial conductor 46, the latter being arranged in telescopic relation with, but spaced from, the inner surfaces of a hollow coaxial conductor 47 electrically connected to the conductive member 43. Two inductive coupling loops 48 and 49 couple the selector system to wave-signal translating apparatus external thereto. The transmission line 41 as thus arranged is of a type disclosed in a copending application of Harold A. Wheeler, Serial No. 565,829, filed November 30, 1944, entitled "Transmission-Line Section," now abandoned, and assigned to the same assignee as the present application. This line is essentially short-circuited at one end, open-circuited at the other, and has an effective electrical length equal to an odd number $n$ of quarter wave lengths as indicated, the electrical length of the line being varied for tuning purposes by axial movement of the conductor 46 thereof. The operation of this modified form of the invention is otherwise essentially similar to that described in connection with Fig. 3 and will not be repeated.

Fig. 5 represents schematically an additionally modified form of selector system embodying the invention. This system utilizes a coaxial transmission line 51 including an outer conductor 52 and a coaxial inner conductor 53 having a telescopic extensible end portion 54 to vary the effective electrical length of the conductor 53 for tuning purposes. The adjusting member 25' is of dielectric material. Inductive coupling loops 56 and 57, located individual fixed distances from the short-circuited end of the line, are utilized to couple the selector system to external wave-signal circuits, not shown. The effective electrical length of the line 51, is equal to an odd number $n$ of quarter wave lengths as indicated, the electrical length of the line being varied for tuning purposes by axial movement of the conductor 54 thereof. The distances of the coupling loops 56 and 57 from the short-circuited end of the line are selected as explained in connection with Fig. 3 to attain a desired value of constant band width for the selector system over the tuning range thereof. The operation of this modified form of the invention is otherwise essentially similar to that of Figs. 3 and 4 and will not be repeated.

Fig. 6 illustrates a form of the present invention as applied to a rectangular wave guide 58 having a width $w$ and height $h$ selected in conventional manner to effect a desired mode of wave-signal propagation. A conductive vane member 59, positioned within the wave guide 58 and having contact fingers 60 around the periphery thereof to engage the inner surfaces of the wave guide, tunes the resonant wave guide in conventional manner, the vane 59 being adjusted longitudinally of the wave guide by a suitable adjusting member 61 mechanically coupled thereto. An inductive coupling member 62 is positioned within the resonant chamber of the wave guide and is connected at one end to the inner conductor 63 of a coaxial transmission line 64, which couples the wave guide to an external wave-signal apparatus, not shown, and is connected at its other end to the opposite side of the wave guide 58 as shown. The diameter of the coupling member 62 is preferably sufficiently large that its inductive reactance is much smaller than the characteristic impedance of the line 64. In this arrangement, the distance $l$ of the vane 59 from the closed end of the wave guide 58 determines the resonant frequency of the wave guide, the distance $l$ being slightly more than one-half wave length at the frequency of a desired wave signal to be translated by the wave guide. Where the wave guide 58 is operated in a mode, such as the $TE_{1,0}$ mode in a rectangular wave guide, having the same sinusoidal magnetic and electric field distributions as in the coaxial transmission lines previously described in connection with Fig. 3, the distance $t$ of the inductive coupling member 62 from the fixed closed end of the wave guide is selected to attain constant band width of the selector system in the same manner as described above with relation to Fig. 3. In this connection, it should be borne in mind that a region of maximum wave-signal impedance is developed along a plane transverse the wave guide and spaced one-quarter wave length from its closed end thus corresponding to the region of maximum wave-signal impedance developed near the center of each of the transmission lines of Fig. 3. In the present arrangement, the spacing $s$ of the coupling member 62 from the side of the wave guide 58 is also effective to determine the magnitude of inductive coupling, and thus the mean band width of the selector system over its range of adjustment.

While the Fig. 6 type of wave-signal selector system has been shown as utilizing a single inductive coupling member, it will be apparent that a plurality of such inductive coupling members may be utilized as in the Fig. 3 selector system. Furthermore, it will be apparent that two or more such wave guides of the Fig. 6 type may be inductively coupled in tandem in accordance with the principles hereinbefore described.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-signal selector system adjustable over a given relatively wide frequency range comprising: a resonant wave guide having a frequency pass band of predetermined band width and adapted to be coupled to an electrical device;

means for adjusting the effective electrical length of said wave guide to tune said selector system over said frequency range; and wave-signal coupling means electrically coupled to said wave guide at a point along the length thereof and adapted to provide said coupling between said wave guide and a resistance component of impedance provided by said device effective to increase said band width of said wave guide, the location of said coupling point being determined by the relation $$\frac{\omega m}{c}\tan\frac{\omega m}{c}=p$$

where $\omega$ represents the angular frequency in radians per second of the signal in said wave guide at resonance, $c$ represents the velocity of light in centimeters per second, $m$ represents the distance in centimeters between said coupling point and one end of said wave guide, and $p$ is a constant having a value determined by the characteristics of said wave guide and said device, whereby said selector system has, for a constant value of said resistance component of impedance, a substantially constant band width for any adjustment within said range.

2. A wave-signal selector system adjustable over a given relatively wide frequency range comprising: a wave guide having at least one end on open circuit and frequency pass band of predetermined band width and adapted to be coupled to an electrical device; means for adjusting the effective electrical length of said wave guide to tune said selector system over said frequency range; and wave-signal coupling means capacitively coupled to said wave guide at a point along the length thereof and adapted to provide said coupling between said wave guide and a resistance component of impedance provided by said device effective to increase said band width of said wave guide, the location of said coupling point being determined at a fixed distance from said one end of said wave guide by the relation $$\frac{\omega m}{c}\tan\frac{\omega m}{c}=p$$

where $\omega$ represents the angular frequency in radians per second of the signal in said wave guide at resonance, $c$ represents the velocity of light in centimeters per second, $m$ represents the distance in centimeters between said coupling point and said one end of said wave guide, and $p$ has a value of 1 or $3/2$ determined by the characteristics of said wave guide and said device, whereby said selector system has, for a constant value of said resistance component of impedance, a substantially constant band width for any adjustment within said range.

3. A wave-signal selector system adjustable over a given relatively wide frequency range comprising: a resonant wave guide having a first fixed region of maximum wave-signal impedance and a frequency pass band of predetermined band width and adapted to be coupled to an electrical device; means co-operating with another region of said wave guide spaced from said first region for providing a second adjustable region of minimum wave-signal impedance to tune said selector system over said frequency range; and wave-signal coupling means capacitively coupled to said wave guide at a point along the length thereof intermediate said first and second regions and adapted to provide said coupling between said wave guide and a resistance component of impedance provided by said device effective to increase said band width of said wave guide, the location of said coupling point being determined at a fixed distance from said first region by the relation $$\frac{\omega m}{c}\tan\frac{\omega m}{c}=p$$

where $\omega$ represents the angular frequency in radians per second of the signal in said wave guide at resonance, $c$ represents the velocity of light in centimeters per second, $m$ represents said fixed distance in centimeters, and $p$ has a value of 1 or $^3/_2$ determined by the characteristics of said wave guide and said device, whereby said selector system has, for a constant value of said resistance component of impedance, a substantially constant band width for any adjustment within said range.

4. A wave-signal selector system adjustable over a given relatively wide frequency range comprising: a resonant wave guide having a fixed region of maximum wave-signal impedance and a frequency pass band of predetermined band width and adapted to be coupled to an electrical device; conductive means movable longitudinally of said wave guide for terminating the electromagnetic field thereof to adjust the effective electrical length of said wave guide to tune said selector system over said frequency range; and wave-signal coupling means capacitively coupled to said wave guide at a point along the length thereof intermediate said region of maximum impedance and said conductive means and adapted to couple thereto a resistance component of impedance provided by said device effective to increase said band width of said wave guide, the loction of said coupling point being determined at a fixed distance from said region of maximum impedance by the relation $$\frac{\omega m}{c}\tan\frac{\omega m}{c}=p$$

where $\omega$ represents the angular frequency in radians per second of the signal in said wave guide at resonance, $c$ represents the velocity of light in centimeters per second, $m$ represents said fixed distance in centimeters, and $p$ has a value of 1 or $^3/_2$ determined by the characteristics of said wave guide and said device, whereby said selector system has, for a constant value of said resistance component of impedance, a substantially constant band width for any adjustment within said range.

5. A wave-signal selector system adjustable over a given relatively wide frequency range comprising: a resonant wave guide of the coaxial transmission type having a fixed region of maximum wave-signal impedance and a frequency pass band of predetermined band width and adapted to be coupled to an electrical device; a conductive member adjustable longitudinally of said line to provide at said member a region of minimum wave-signal impedance to tune said selector system over said frequency range, and wave-signal coupling means capacitively coupled to said transmission line at a point along the length thereof and adapted to couple thereto a resistance component of impedance provided by said device effective to increase said band width of said transmission line, the location of said coupling point being determined at a fixed distance from said region of maximum impedance by the relation $$\frac{\omega m}{c}\tan\frac{\omega m}{c}=p$$

where $\omega$ represents the angular frequency in radians per second of the signal in said wave guide at resonance, $c$ represents the velocity of light in centimeters per second, $m$ represents said fixed distance in centimeters, and $p$ has a value of 1 or $^3/_2$ determined by the characteristics of said wave guide and said device, whereby said selector system has, for a constant value of said resistance component of impedance, a substantially constant band width for any adjustment within said range.

6. A wave-signal selector system adjustable over a given relatively wide frequency range comprising: a resonant wave guide having at least one closed end and a frequency pass band of predetermined band width and adapted to be coupled to an electrical device; means for adjusting the effective electrical length of said wave guide to tune said selector system over said frequency range; and wave-signal coupling means inductively coupled to said wave guide at a point along the length thereof and adapted to couple thereto a resistance component of impedance provided by said device which is effective to increase said band width of said wave guide, the location of said coupling point being determined at a fixed distance from said closed end of said wave guide by the relation $$\frac{\omega m}{c}\tan\frac{\omega m}{c}=p$$

where $\omega$ represents the angular frequency in radians per second of the signal in said wave guide at resonance, $c$ represents the velocity of light in centimeters per second, $m$ represents said fixed distance in centimeters, and $p$ has a value of 1 or $^3/_2$ determined by the characteristics of said wave guide and said device, whereby said selector system has, for a constant value of said resistance component of impedance, a substantially constant band width for any adjustment within said range.

7. A wave-signal selector system adjustable over a given relatively wide frequency range comprising: a resonant wave guide having a fixed region of minimum wave-signal impedance and a frequency pass band of predetermined band width adapted to be coupled to an electrical device; means co-operating with another region of said wave guide spaced from said first-mentioned region for providing a second adjustable region of high wave-signal impedance to tune said selector system over said frequency range; and wave-signal coupling means inductively coupled to said wave guide at a point along the length thereof intermediate said first-mentioned and second-mentioned regions and adapted to couple thereto a resistance component of impedance provided by said device which is effective to increase said band width of said wave guide, the location of said coupling point being determined at a fixed distance from said region of minimum impedance by the relation $$\frac{\omega m}{c}\tan\frac{\omega m}{c}=p$$

where $\omega$ represents the angular frequency in radians per second of the signal in said wave guide at resonance, $c$ represents the velocity of light in centimeters per second, $m$ represents said fixed distance in centimeters, and $p$ has a value of 1 or $^3/_2$ determined by the characteristics of said wave guide and said device, whereby said selector system has, for a constant value of said resistance component of impedance, a substantially constant band width for any adjustment within said range.

8. A wave-signal selector system adjustable over a given relatively wide frequency range comprising: a resonant wave guide closed at one end having an electrical length approximately equal to an integral number of half wave lengths at the frequency of resonance thereof and a frequency pass band of predetermined band width and adapted to be coupled to an electrical device; conductive means closing the other end of said wave guide and movable longitudinally thereof to tune said selector system over said frequency range; and wave-signal coupling means inductively coupled to said wave guide at a point along the length thereof and adapted to couple thereto a resistance component of impedance provided by said device which is effective to increase said band width of said wave guide, the location of said coupling point being determined at a fixed distance from said one end of said wave guide by the relation $$\frac{\omega m}{c}\tan\frac{\omega m}{c}=p$$

where $\omega$ represents the angular frequency in radians per second of the signal in said wave guide at resonance, $c$ represents the velocity of light in centimeters per second, $m$ represents said fixed distance in centimeters, and $p$ has a value of 1 or $^3/_2$ determined by the characteristics of said wave guide and said device, whereby said selector system has, for a constant value of said resistance component of impedance, a substantially constant band width for any adjustment within said range.

9. A wave-signal selector system adjustable over a given relatively wide frequency range comprising: a plurality of resonant wave guides; means for adjusting the effective electrical lengths of said wave guides to tune said selector system over said frequency range; and wave-signal coupling means electrically coupling said guides at a point along the length of each thereof; the locations of said coupling points being determined by the relation $$\frac{\omega b}{c}\tan\frac{\omega b}{c}=1$$

where $\omega$ represents the angular frequency in radians per second of the signal in each of said wave guides at resonance, $c$ represents the velocity of light in centimeters per second, and $b$ represents the distance in centimeters between each of said coupling points and the end of each of said wave guides opposite said adjusting means, whereby said selector system has a substantially constant over-all band width for any adjustment within said range.

10. A wave-signal selector system adjustable over a given relatively wide frequency range comprising: a plurality of resonant wave guides; means for simultaneously adjusting the effective electrical lengths of said wave guides to tune said selector system over said frequency range; and wave-signal coupling means electrically coupling said wave guides at a point along the length of each thereof; the locations of said coupling points being determined by the relation $$\frac{\omega b}{c}\tan\frac{\omega b}{c}=1$$

where $\omega$ represents they angular frequency in radians per second of the signal in each of said wave guides at resonance, $c$ represents the velocity of light in centimeters per second, and b represents the distance in centimeters between each of said coupling points and the end of each of said wave guides opposite said adjusting means, whereby said selector system has a substantially constant over-all band width for any adjustment within said range.

11. A wave-signal selector system adjustable over a given relatively wide frequency range comprising: a plurality of resonant wave guides each having a fixed region of maximum wave-signal impedance; tuning means co-operating with another region of each of said wave guides spaced from said region of maximum impedance for providing each thereof a second adjustable region of minimum wave-signal impedance to tune said selector system over said frequency range; and wave-signal coupling means capacitively coupling said wave guides at a point along the length of each thereof; the locations of said coupling points being determined at a fixed distance from said regions of maximum impedance by the relation $$\frac{\omega b}{c}\tan\frac{\omega b}{c}=1$$

where $\omega$ represents the angular frequency in radians per second of the signal in each of said wave guides at resonance, $c$ represents the velocity of light in centimeters per second, and $b$ represents said fixed distance in centimeters, whereby said selector system has a substantially constant over-all band width for any adjustment within said range.

12. A wave-signal selector system adjustable over a given relatively wide frequency range comprising: a plurality of resonant wave guides each having a fixed region of maximum wave-signal impedance; conductive means terminating the electromagnetic field of each of said wave guides and adjustable longitudinally thereof to tune said selector system over said frequency range; and wave-signal coupling means capacitively coupling said wave guides at a point along the length of each thereof; the locations of said coupling points being determined at a fixed distance from said regions of maximum impedance by the relation $$\frac{\omega b}{c}\tan\frac{\omega b}{c}=1$$

where $\omega$ represents the angular frequency in radians per second of the signal in each of said wave guides at resonance, $c$ represents the velocity of light in centimeters per second, and $b$ represents said fixed distance in centimeters, whereby said selector system has a substantially constant over-all band width for any adjustment within said range.

13. A wave-signal selector system adjustable over a given relatively wide frequency range comprising: a plurality of resonant wave guides each having at least one closed end; means for adjusting the effective electrical lengths of said wave guides to tune said selector system over said frequency range; and wave-signal coupling means inductively coupling said wave guides at a point along the length of each thereof; the locations of said coupling points being determined at a fixed distance from said closed ends of said wave guides by the relation $$\frac{\omega b}{c}\tan\frac{\omega b}{c}=1$$

where $\omega$ represents the angular frequency in radians per second of the signal in each of said wave guides at resonance, $c$ represents the velocity of light in centimeters per second, and $b$ represents said fixed distance in centimeters, whereby said selector system has a substantially constant over-all band width for any adjustment within said range.

14. A wave-signal selector system adjustable over a given relatively wide frequency range comprising: a plurality of resonant wave guides each having a fixed region of minimum wave-signal impedance; tuning means co-operating with another region of each of said guides spaced from said region of minimum impedance for providng in each thereof a second adjustable region of maximum wave-signal impedance to tune said selector system over said frequency range; and wave-signal coupling means inductively coupling said wave guides at a point along the length of each thereof intermediate said high-impedance and low-impedance regions; the locations of said coupling points being determined at a fixed distance from said regions of minimum impedance by the relation $$\frac{\omega b}{c}\tan\frac{\omega b}{c}=1$$

where $\omega$ represents the angular frequency in radians per second of the signal in each of said wave guides at resonance, $c$ represents the velocity of light in centimeters per second, and $b$ represents said fixed distance in centimeters, whereby said selector system has a substantially constant over-all band width for any adjustment within said range.

15. A wave-signal selector system adjustable over a given relatively wide frequency range comprising: a plurality of resonant wave guides each closed at one end and having an electrical length of approximately one-half wave length at the frequency of resonance thereof; conductive means closing the other end of each of said wave guides and adjustable longitudinally thereof for adjusting the effective electrical lengths of said wave guides to tune said selector system over said frequency range; and wave-signal coupling means inductively coupling said wave guides at a point along the length of each thereof; the locations of said coupling points being determined at a fixed distance from said one end of said wave guides by the relation $$\frac{\omega b}{c}\tan\frac{\omega b}{c}=1$$

where $\omega$ represents the angular frequency in radians per second of the signal in each of said wave guides at resonance, $c$ represents the velocity of light in centimeters per second, and $b$ represents said fixed distance in centimeters, whereby said selector system has a substantially constant over-all band width for any adjustment within said range.

16. A wave-signal selector systme adjustable over a given relatively wide frequency range comprising: a plurality of resonant wave guides each having a frequency pass band of predetermined band width and adapted to be coupled to one another and to an electrical device; means for adjusting the effective electrical lengths of said wave guides to tune said selector system over said frequency range; a plurality of wave-signal coupling means electrically coupled to individual ones of said wave guides at a first point along the length of each thereof and adapted to provide said coupling between said wave guides and individual resistance components of impedance provided by said device effective to increase said band width of said individual wave guides, the locations of said first coupling points being determined by the relation $$\frac{\omega a}{c}\tan\frac{\omega a}{c}=\frac{3}{2}$$

where $\omega$ represents the angular frequency in radians per second of the signal in each of said wave guides at resonance, $c$ represents the velocity of light in centimeters per second, and $a$ represents the distance in centimeters between each of said coupling points and one end of said wave guides; and wave-signal coupling means electrically coupling said wave guides at a second point along the length of each thereof, the locations of said last-mentioned points being determined by the relation $$\frac{\omega b}{c}\tan\frac{\omega b}{c}=1$$

where $\omega$ and $c$ represent above-mentioned characteristics of said wave guides at resonance, and $b$ represents the distance in centimeters between each of said second predetermined points and one end of each of said wave guides, whereby said wave guides, for constant values of said individual resistance components of impedance, and said selector system have substantially constant band width for any adjustment within said range.

BENJAMIN F. TYSON.

REFERENCES CITED

The following references are of record in the file of this patent:

UNITED STATES PATENTS

| Number | Name | Date |
|---|---|---|
| 2,220,922 | Trevor | Nov. 12, 1940 |
| 2,239,905 | Trevor | Apr. 29, 1941 |
| 2,266,501 | Lindenblad | Dec. 16, 1941 |
| 2,284,529 | Mason | May 26, 1942 |
| 2,358,462 | Mahren | Sept. 19, 1944 |